NEW ORGANIC PHOSPHORUS COMPOUNDS AND PROCESS FOR THEIR MANUFACTURE

Ernst Beriger, Allschwil, near Basel, and Richard Sallmann, Binningen, near Basel, Switzerland, assignors to Ciba Limited, Basel, Switzerland, a Swiss firm No Drawing. Application January 14, 1958
Serial No. 708,760

Claims priority, application Switzerland
November 3, 1955

18 Claims. (Cl. 167—22)

This invention provides new organic phosphorus compounds of the general formula

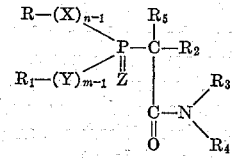

in which R, $R_1$, $R_3$ and $R_4$ represent alkyl, cycloalkyl, aralkyl, aryl or heterocyclic radicals, which may contain substituents, and R and $R_1$, on the one hand, and $R_3$ and $R_4$, on the other, may together form part of a ring system, $R_3$ and $R_4$ may also represent hydrogen, $R_2$ represents a halogen atom, $R_5$ represents the group

(in which $R_6$ represents an alkyl, aryl or heterocyclic radical), X and Y represent —O—, —S—, >NH— or N—R, and Z represents oxygen or sulfur, and $n$ and $m$ each represent a whole number not greater than 2, or compounds of the general formula

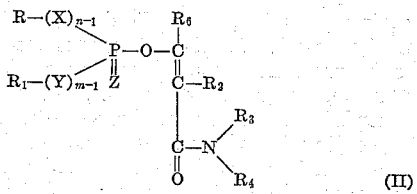

in which R, $R_1$, $R_2$, $R_3$, $R_4$, $R_6$, X, Y, Z, $n$ and $m$ have the meanings given above. It has not yet been established with certainty which of the Formulae I and II should be ascribed to the compounds of the invention. It is possible that, depending on the method of preparation, only one or other of these forms is produced, or one form is produced preferentially. It is known that in the reaction of trialkyl phosphites with certain halogen-compounds according to Michaelis and Arbuzow rearrangements occur, so that instead of the expected phosphonic acid derivatives isomeric phosphoric acid esters are formed. In the case of the present invention, for example, the condensation product of α:α-dichloroacetoacetic acid N-diethylamide and trimethyl phosphite can be given in the following two formulae

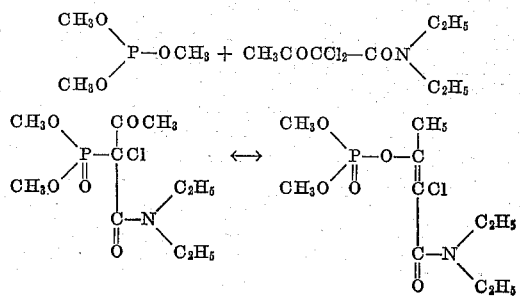

The present invention therefore includes compounds of the Formulae I and II, and also any mixtures thereof, since the isomerism of the compounds can be regarded as a keto-enol tautomerism. Whenever, hereinafter only one of these forms is given it is to be understood that the other form is included, provided that it appears to be capable of existing.

This application is a continuation-in-part of now abandoned application Serial Number 618,673, filed October 29, 1956.

The new compounds are valuable agents for combating pests, especially animal pests. They are effective against the various stages of development, such as eggs, larvae and imagines (i.e. the adults of the insects), the compounds acting as contact poisons and stomach poisons. Suitably substituted compounds when applied to plants have an intra-therapeutic, or so-called systemic action. Especially valuable are compounds of the general formula

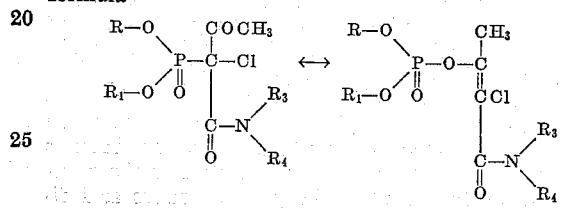

in which R and $R_1$ represent lower alkyl radicals containing 1–4 carbon atoms, and $R_3$ and $R_4$ represent hydrogen or lower alkyl radicals containing 1–4 carbon atoms.

The invention also includes a process for the manufacture of the new compounds, wherein a compound of the formula

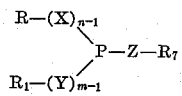

in which R, $R_1$, $n$, $m$, X, Y and Z have the meanings given above and $R_7$ represents a lower alkyl radical containing 1–4 carbon atoms is condensed with a compound of the formula

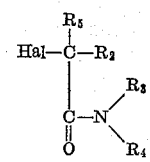

in which $R_2$, $R_3$, $R_4$ and $R_5$ have the meanings given above and Hal represents a halogen atom, such as bromine or advantageously chlorine, accompanied by the splitting off of a compound of the formula $R_7$-Hal.

The compounds of the general formula

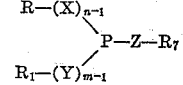

used as starting materials are derivatives of trivalent phosphorus, whereas the products to be used in accordance with the invention are derivatives of pentavalent phosphorus.

Among the compounds of the last mentioned formula the most easily accessible are those in which the symbols X, Y and Z represent oxygen. They correspond to the general formula

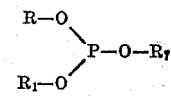

and can be made by methods in themselves known.

The aliphatic radicals, which are represented by the symbols R and $R_1$, may have straight or branched chains and may be saturated or unsaturated and they may be substituted or unsubstituted. There may be mentioned, for example, methyl, ethyl, propyl, isopropyl, butyl, hexyl, 2-ethylbutyl, octyl, 2-butyloctyl, dodecyl, octadecyl, allyl and 2-chloroethyl groups, and also radicals containing thiocyano, cyano or ester groups. The residues R and $R_1$ may be identical or different from one another. $R_7$ is advantageously a lower alkyl radical containing 1–4 carbon atoms. For example, there may be mentioned the following compounds:

Trimethyl phosphite, triethyl phosphite, tripropyl phosphite, diethyl dodecyl phosphite, tri-(2-chloroethyl) phosphite and the ester of the formula

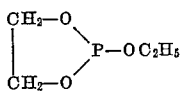

The aromatic radicals, which R and $R_1$ may represent may be mononuclear or polynuclear and may, if desired, contain nuclear substituents. There may be mentioned phenyl, 2- or 4-chlorophenyl, 2:4-dichlorophenyl, 4-methoxyphenyl, 4-nitrophenyl, naphthyl and 4-diphenyl groups, compounds such as 2:4-dichlorophenyl diethyl phosphite or 4-chlorophenyl dimethyl phosphite. There may also be mentioned compounds in which one or two radicals are bound directly through a carbon atom to the phosphorus atom, for example, phenyl-phosphonous acid diethyl ester of the formula

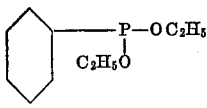

Among the araliphatic radicals, which R and $R_1$ may represent, there may be mentioned the benzyl group, and among the cycloaliphatic radicals there may be mentioned the cyclohexyl group, and among heterocyclic radicals there may be mentioned the tetrahydrofurfuryl group. Starting materials containing such radicals are, for example, cyclohexyl diethyl phosphite, tetrahydrofurfuryl dimethyl phosphite and dibenzyl propyl phosphite. Among the compounds, in which X and Y represent sulfur, there may be mentioned triethyl thiophosphite of the formula

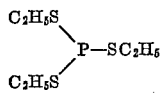

and among those in which X and Y represent nitrogen, there may be mentioned the compounds of the formula

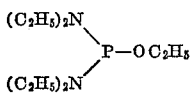

The compounds of the general formula

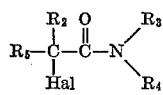

are amides of halogenated acylacetic acids, and advantageously acetoacetic acids. The radicals $R_3$ and $R_4$ may have the meanings given above for the radicals R and $R_1$. Advantageously they represent alkyl groups containing 1–4 carbon atoms, or form a heterocyclic ring together with the nitrogen atom, for example, the ring of morpholine or piperidine.

The radical $R_2$ represents a halogen atom, advantageously a chlorine atom. As stated above, the radical $R_5$ represents a radical $-CO-R_6$. $R_6$ may represent a heterocyclic radical, an aryl radical, for example, the phenyl, chlorophenyl or nitrophenyl group, or especially an alkyl group containing 1–4 carbon atoms. Advantageously, the radical $R_6$ is a methyl group and the radical $R_5$ a $-COCH_3$ group, that is to say, the starting compounds are advantageously aceto acetic acid amides.

The products of the invention are produced by heating the reaction components at a raised temperature, for example, 50–200° C. and advantageously at about 90–150° C. It may be advantageous or convenient to work in an inert solvent such as benzene, toluene, xylene, chlorobenzene or benzine, and, if desired, in an inert gaseous atmosphere, for example, under nitrogen, and/or reduced pressure.

As stated above the products of the invention are valuable agents for combating pests. Accordingly, the invention also provides preparations for combating pests which comprise such a product as active substance in admixture with a carrier. There are advantageously used compounds of the general formula

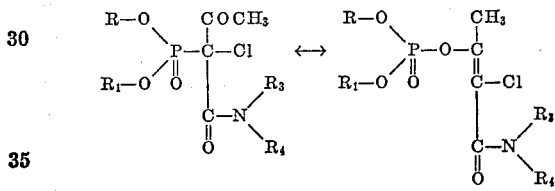

in which R and $R_1$ represent alkyl groups containing 1–4 carbon atoms, and $R_3$ and $R_4$ represent hydrogen or if desired alkyl groups containing 1–4 carbon atoms.

A very wide variety of materials can be protected against pests, a gaseous, liquid or solid material being used as carrier for the active substance. The material to be protected or to be used as carriers may be, for example, air, especially in rooms, or liquids, for example, water in ponds, or any non-living substratum, for example, any objects in living rooms, in cellars, in plaster floors, stables, and also pelts, feathers, wool or the like and also living organisms of the vegetable and animal kingdom in very wide variety of stages of development, provided that they are not sensitive to the pest-controlling agent.

The usual methods can be used for combating pests, for example, by treating the material to be protected with the active compound in the form of vapor, for example, in the form of a smoke, or in the form of a dusting or spraying preparation, for example, a solution or suspension which has been prepared with water or a suitable organic solvent, for example, alcohol, petroleum, a tar distillate or the like.

There may also be used for brushing, spraying or immersing the materials to be protected aqueous solutions of the active substances or aqueous emulsions of organic solvents which contain the active substances.

The spraying or dusting preparations may contain the usual inert fillers or identifying agents, for example, kaolin, gypsum or bentonite, or further additions such as sulfite cellulose waste liquor, cellulose derivatives or the like, and they may also contain the usual wetting or adherent agents for improving their wetting capacity and adhesive power. The pest combating preparations may be made up in powdered form, in the form of aqueous dispersions or pastes or as self-emulsifying oils.

The compounds of the invention may constitute the sole active substance in the pest combating preparations or they may be present together with other insecticides and/or fungicides. These preparations may be used for protecting plants by the usual spraying, casting, dusting or fumigation methods.

The following examples illustrate the invention, the parts and percentages being by weight unless otherwise stated and the relationship of parts by weight to parts by volume being the same as that of the kilogram to the liter:

*Example 1*

11.3 parts of dichloracetoacetic acid diethylamide (boiling at 92.5–93° C. under 0.18 mm. pressure) and 8.3 parts of triethyl phosphite are mixed together at room temperature. In order to initiate the reaction the mixture is heated to 90° C. At that temperature a violent evolution of gas sets in, and the reaction solution heats up to 160° C. without external heating. When the reaction is finished the product is subjected for a short time longer at 95° C. to the reduced pressure of a water jet pump. There remains behind a red, green iridescent oil (16.1 parts), which can be purified by distillation in a high vacuum. It boils at 144° C. under 0.1 mm. pressure.

$C_{12}H_{23}O_5NClP$.—Calculated: N, 4.27%; Cl, 10.82%. Found: N, 4.24%; Cl, 10.97%.

The dichloracetoacetic acid diethylamide used for making the above condensation product can be obtained by chlorinating acetoacetic acid diethylamide with 2 mols of sulfuryl chloride.

*Example 2*

A mixture of 33.8 parts of dichloracetoacetic acid diethylamide and 34 parts of chlorobenzene are heated to the boil. 20.5 parts of trimethyl phosphite are added dropwise in the course of 5 minutes. A vigorous evolution of gas sets in, which ceases after boiling the mixture for one hour under reflux. The easily volatile portion and the chlorobenzene are removed under the reduced pressure of a water jet pump and there are obtained as residue 45.0 parts of an orange colored oil, which can be distilled under a high vacuum. It boils at 138–142° C. under 0.1 mm. pressure (37.2 parts=82.6 percent of the theoretical yield).

$C_{10}H_{19}O_5NClP$.—Calculated: C, 40.07%; H, 6.39%; N, 4.67%; Cl, 11.83%; P, 10.34%. Found: C, 39.90%; H, 6.61%; N, 4.70%; Cl, 11.78%; P, 10.38%.

*Example 3*

8.5 parts of dichloracetoacetic acid amide (melting at 65° C.) are covered with 20 parts by volume of xylene. The mixture is heated to 90° C. and 8.3 parts of triethyl phosphite are added dropwise. The temperature remains at 110–120° C. without external heating and ethyl chloride escapes from the reaction mixture. The solvent is then removed in vacuo at 95° C. 13.6 parts of a reddish, green opalescent oil remain behind as residue. The product dissolves well in acetone and alcohol and is less soluble in ether.

The dichloracetoacetic acid amide can be obtained from acetoacetic acid amide by chlorination in chloroform with 2 mols of sulfuryl chloride.

*Example 4*

6.2 parts of trimethyl phosphite are slowly added to a mixture of 8.5 parts of dichloracetoacetic acid amide and 20 parts by volume of xylene, which has been heated to 90–100° C., the addition being made in such manner that the temperature remains at 110–120° C. without external heating. When the evolution of gas ceases, the xylene is removed at a bath temperature of 95° C. under the reduced pressure of a water jet pump. The reaction product is a reddish green iridescent oil (11.5 parts) and dissolves well in acetone and alcohol.

In an analogous manner the halogenated β-keto-acid amides mentioned in the following table can be reacted with tertiary phosphites. Only a part of the resulting esters of which the properties are also given in the table, can be distilled in a high vacuum without decomposition. However, for the production of pest combating preparations purification of the compounds by distillation can be dispensed with.

| No. | Acid amide | Halogenated acid amide | Phosphite components and properties of the esters obtained | |
|---|---|---|---|---|
| 1–2 | $CH_3COCH_2CONHCH_3$ boils at 100–102° C. (0.8 mm. pressure). | $CH_3COCCl_2CONHCH_3$ melting at 59–60° C. | $(CH_3O)_3P$ Oil, dissolves well in water, alcohol, acetone; boils at 135° C. (1.5 mm. pressure) with decomposition. | $(C_2H_5O)_3P$ Oil, soluble in water, alcohol, acetone. |
| 3–4 | $CH_3COCH_2CONHC_2H_5$ boils at 120° C. (1.8 mm. pressure). | $CH_3COCCl_2CONHC_2H_5$ boils at 91° C. (0.15 mm. pressure). | $(CH_3O)_3P$ Oil, soluble in alcohol and acetone, poorly soluble in water. | $(C_2H_5O)_3P$ Oil, soluble in alcohol and acetone, poorly soluble in water. |
| 5–6 | $CH_3COCH_2CONHC_3H_7$ boils at 104–106° C. (0.4 mm. pressure), crystalline. | $CH_3COCCl_2CONHC_3H_7(n)$ viscous oil. | $(CH_3O)_3P$ viscous oil, soluble in alcohol and acetone. | $(C_2H_5O)_3P$ Oil, soluble in alcohol and acetone. |
| 7–8 | $CH_3COCH_2CONHC_3H_7$-(iso) boils at 91–94° C. (0.2 mm. pressure) crystalline. | $CH_3COCCl_2CONHC_3H_7$-(iso) melting at 51° C. | $(CH_3O)_3P$ Oil, soluble in alcohol and acetone. | $(C_2H_5O)_3P$ sparingly mobile oil, soluble in alcohol and acetone. |
| 9–10 | $CH_3COCH_2CONHC_4H_9(n)$ boils at 110–114° C. (0.2 mm. pressure crystalline. | $CH_3COCCl_2CONHC_4H_9(n)$ viscous oil. | $(CH_3O)_3P$ oil, soluble in alcohol and acetone. | $(C_2H_5O)_3P$ viscous oil, soluble in alcohol and acetone. |
| 11–12 | $CH_3COCH_2CON(CH_3)_2$ boils at 75–77° C. (1.8 mm. pressure). | $CH_3COCCl_2CON(CH_3)_2$ boils at 68° C. (0.035 mm. pressure). | $(CH_3O)_3P$ oil, soluble in alcohol and acetone. | $(C_2H_5O)_3P$ oil, boils at 152–156° C. (0.35 mm. pressure) soluble in alcohol and acetone. |
| 13 | $CH_3COCH_2CON(C_2H_5)_2$ boils at 68.5–70° C. (0.58 mm. pressure). | $CH_3COCCl_2CON(C_2H_5)_2$ boils at 92.5–93° C. (0.18 mm. pressure). | $[(CH_3)_2CHO]_3P$ thinly liquid oil, soluble in alcohol and acetone. | |
| 14–15 | | $CH_3COCBr_2CON(C_2H_5)_2$ boils at 88–89.5° C. (0.4 mm. pressure). | $(CH_3O)_3P$ Oil, soluble in water, alcohol and acetone. | $(C_2H_5O)_3P$ Oil, soluble in water, alcohol and acetone. |

| No. | Acid amide | Halogenated acid amide | Phosphite components and properties of the esters obtained | |
|---|---|---|---|---|
| 16–17 | $CH_3COCH_2CON(C_3H_7n)_2$ boils at 83–84° C. (0.52 mm. pressure). | $CH_3COCCl_2CON(C_3H_7n)_2$ boils at 94–102° C. (0.04 mm. pressure). | $(CH_3O)_3P$ Oil, soluble in alcohol and acetone. | $(C_2H_5O)_3P$ easily mobile oil, soluble in alcohol and acetone. |
| 18–19 | $CH_3COCH_2CON(C_3H_7iso)_2$ boils at 87–90° C. (1.7 mm. pressure). | $CH_3COCCl_2CON(C_3H_7iso)_2$ melts at 60° C. | $(CH_3O)_3P$ oil, boils at 154° C. (0.35 mm. pressure) soluble in alcohol and acetone. | $(C_2H_5O)_3P$ yellowish oil soluble in alcohol and acetone. |
| 20–21 | $CH_3COCH_2CON(C_4H_9)_2$ boils at 102–104° C. (0.63 mm. pressure). | $CH_3COCCl_2CON(C_4H_9n)_2$ boils at 134–136° C. (0.25 mm. pressure). | $(CH_3O)_3P$ oil soluble in alcohol and acetone. | $(C_2H_5O)_3P$ oil, soluble in alcohol and acetone. |
| 22 | $CH_3COCH_2CONHCH_2$ \| $CH_3COCH_2CONHCH_2$ melts at 165–166° C. | $CH_3COCCl_2CONHCH_2$ \| $CH_3COCCl_2CONHCH_2$ | | $(C_2H_5O)_3P$ sparingly mobile oil soluble in alcohol and acetone. |
| 23–24 | $CH_3COCH_2CONH$–⟨H⟩ melts at 71.5–72° C. | $CH_3COCCl_2CONH$–⟨H⟩ melts at 54–56° C. | $(CH_3O)_3P$ yellow oil, soluble in alcohol and acetone. | $(C_2H_5O)_3P$ viscous oil, soluble in alcohol and acetone. |
| 25–26 | $CH_3COCH_2CONH$–⟨H, CH_3⟩ melts at 65–67° C. | $CH_3COCCl_2CONH$–⟨H, CH_3⟩ melts at 56–57° C. | $(CH_3O)_3P$ oil, soluble in alcohol and acetone. | $(C_2H_5O)_3P$ oil, soluble in alcohol and acetone. |
| 27–28 | $CH_3COCH_2CON⟨⟩$ boils at 107° C. (1 mm. pressure). | $CH_3COCCl_2CON⟨⟩$ boils at 122° C. (0.55 mm. pressure). | $(CH_3O)_3P$ oil, soluble in alcohol and acetone. | $(C_2H_5O)_3P$ oil, soluble in alcohol and acetone. |
| 29–30 | $CH_3COCH_2CON⟨O⟩$ melts at 65–67° C. | $CH_3COCCl_2CON⟨O⟩$ viscous oil. | $(CH_3O)_3$ thick oil, light yellow, soluble in alcohol and acetone. | $(C_2H_5O)_3P$ oil, soluble in ether, alcohol and acetone. |
| 31 | $CH_3COCH_2CONH$–⟨⟩ melts at 85° C. | $CH_3COCCl_2CONH$–⟨⟩ melts at 47° C. | | $(C_2H_5O)P$ thick oil, soluble in alcohol and acetone. |
| 32–33 | $CH_3COCH_2CONH$⟨⟩–Cl melts at 124° C. | $CH_3COCCl_2CONH$⟨⟩–Cl melts at 55–56° C. | $(CH_3O)_3P$ viscous oil, soluble in alcohol and acetone. | $(C_2H_5O)_3P$ viscous oil, soluble in alcohol, acetone and ether. |
| 34–35 | $CH_3COCH_2CONH_2CONH$⟨Cl, Cl⟩ melts at 88–89° C. | $CH_3COCCl_2CONH$⟨Cl, Cl⟩ boils at 124–126° C. (0.05 mm. pressure) | $(CH_3O)_3P$ viscous oil, soluble in alcohol and acetone. | $(C_2H_5O)_3P$ viscous oil, soluble in alcohol and acetone. |
| 36–37 | $C_3H_7COCH_2CON(C_2H_5)_2$ boils at 101–102° C. (0.2 mm. pressure). | $C_3H_7COCCl_2CON(C_2H_5)_2$ easily mobile oil. | $(CH_3O)_3P$ mobile oil, soluble in alcohol and acetone. | $(C_2H_5O)_3P$ mobile oil, soluble in alcohol and acetone. |
| 38–39 | ⟨O⟩–$COCH_2CON(C_2H_5)_2$ boils at 112° C. (0.15 mm. pressure). | ⟨O⟩–$COCCl_2CON(C_2H_5)_2$ viscous oil. | $(CH_3O)_3P$ thinly liquid oil, soluble in alcohol and acetone. | $(C_2H_5O)_3P$ thinly liquid oil, soluble in alcohol and acetone. |
| 40–41 | ⟨⟩$COCH_2CON(C_2H_5)_2$ boils at 134–135° C. (0.1 mm. pressure). | ⟨⟩$COCCl_2CON(C_2H_5)_2$ melts at 55–56° C. | $(CH_3O)_3P$ viscous oil, soluble in alcohol and acetone. | $(C_2H_5O)_3P$ viscous oil, soluble in alcohol and acetone. |

*Example 5*

11.3 parts of dichloracetoacetic acid diethylamide are heated to the boil in 15 parts by volume of xylene and 12.2 parts of diethyl-tetrahydrofurfuryl phosphite

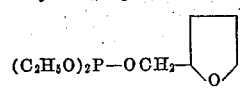

$(C_2H_5O)_2P$–$OCH_2$–

(boiling at 59° C. under 0.4 mm. pressure) are added to the mixture in the course of 5 minutes. In order to complete the reaction the mixture is maintained at the boil for a further hour. 2.5 parts of ethyl chloride distil over. The xylene is removed in vacuo and a small amount of starting material still present is removed at a bath temperature of 180–190° C. in a high vacuum. The residue consists of 14.9 parts of a light colored oil, which dissolves very well in acetone and alcohol and less well in water.

In an analogous manner the following phosphites are reacted with dichloracetoacetic acid diethyl amide:

| Phosphite | Reaction product of the phosphite with dichloracetoacetic acid diethylamide |
|---|---|
| $(C_2H_5O)_2P—OCH_2CH=CH_2$ boils at 64–66° C. (12 mm pressure). | light oil, soluble in alcohol and acetone. |
| $(C_2H_5O)_2P—OC_2H_4SC_2H_5$ boils at 59–61° C. (0.1 mm. pressure). | viscous oil, soluble in alcohol and acetone. |
| $(C_2H_5O)_2P—OCH_2$—⟨ ⟩ boils at 84° C. (0.3 mm. pressure). | oil, soluble in alcohol and acetone. |
| $(C_2H_5O)P—O$—⟨H⟩ boils at 50° C. (0.3 mm. pressure). | easily mobile oil, soluble in alcohol and acetone. |
| $(C_2H_5O)_2P—O$—⟨ ⟩Cl boils at 70–75° C. (0.1 mm. pressure). | viscous oil, soluble in alcohol and acetone. |

*Example 6*

11.3 parts of dichloracetoacetic acid diethylamide are heated to 150 C. and 7.5 parts of ethyl-ethylene phosphite

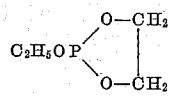

(boiling at 49° C. under 10 mm. pressure) are added dropwise in the course of 5 minutes. The mixture is maintained at 160° C. for a further 1¼ hours until the evolution of ethyl chloride ceases. 1.2 parts of ethyl chloride are collected. The reaction does not proceed solely with the splitting off of ethyl chloride, but there is also a partial splitting of the ethylene phosphite ring. The starting materials still present are removed in a high vacuum at a bath temperature of 180° C., and there is obtained as residue a viscous oil (10.8 parts), which dissolves well in alcohol and acetone and less well in water.

*Example 7*

11.3 parts of dichloracetoacetic acid diethylamide are heated to 180° C. 11.7 parts of tri-thioethyl phosphite $(C_2H_5S)_3P$ are added dropwise in the course of 5 minutes, and the evolution of ethyl chloride is allowed to subside by heating the mixture for ¼ hour at 180° C. The starting materials still present are removed in a high vacuum at 150° C., and there is obtained as residue a viscous mass (17.6 parts), which dissolves easily in chloroform and less well in alcohol and acetone.

*Example 8*

10.6 parts of O-diethyl-N-diethylamido-phosphite $(C_2H_5O)_2PN(C_2H_5)_2$ are added in the course of 5 minutes to a mixture of 11.3 parts of dichloracetoacetic acid diethylamide and 15 parts by volume of xylene at the boiling temperature. After 10 minutes the evolution of ethyl chloride (3.0 parts) ceases. The xylene is removed under the reduced pressure of a water jet pump and a small amount of starting material present is removed in a high vacuum at a bath temperature of 180° C. As residue there is obtained a light colored easily mobile oil, which dissolves well in acetone and alcohol and is less soluble in water.

*Example 9*

11.3 parts of dichloracetoacetic acid dimethylamide are heated to the boil with 15 parts by volume of xylene and 10.9 parts of phenyl-phosphonous acid diethyl ester.

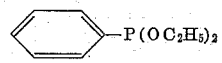

(boiling at 108–114° C.) are added dropwise. The reaction is complete in about 1 hour, during which 2.8 parts of ethyl chloride are collected. After removing the xylene in vacuo and a small amount of starting material in a high vacuum at a bath temperature of 180° C., there are obtained 15.4 parts of a viscous oil, which dissolves well in alcohol and acetone.

*Example 10*

2 parts of the condensation product of Example 1 or 2 are mixed with 1 part of the condensation product of 1 mol of tertiary octyl-phenol and 8 mols of ethylene oxide, and 7 parts of isopropanol. A clear solution is obtained which can be used as a concentrate for preparing spray liquors and can be emulsified by pouring it into water.

A. In order to demonstrate the intra-therapeutic, so-called systemic, action of the preparation the following experiment was carried out with the use of spray liquors having contents of active substance of 0.08 percent, 0.04 percent, and 0.02 percent.

The lower leaves were removed from broad bean plants (*Vicia fabae*) which were heavily infested with aphids (*Doralis fabae*), and a color mark was applied halfway up the stalk of each plant. Then the lower half of the stalk of two plants was sprayed with one of the spraying liquors of one of the above concentrations. After 24 hours the extent to which the aphids had been controlled in the upper non-sprayed part of the plants was examined. The results obtained are given in the following table:

| Spray liquor concentration | Effect on the aphids after 48 hours ||
|---|---|---|
|  | Compound of Example 1 | Compound of Example 2 |
| 0.08% | ++ | ++ |
| 0.04% | ++ | ++ |
| 0.02% | ++ | ++ |

For each plant a sign was used. + means that no living aphids were present, | means a good action such that only a few aphids were still alive, and — means an insufficient action or no action.

B. In order to demonstrate the contact action on aphids the following experiment was carried out with the use of spray liquors having contents of active substance of 0.08 percent, 0.04 percent and 0.02 percent.

Broad bean plants, which were heavily infested with aphids, were sprayed on all sides and after 48 hours the effect was examined. When a 100% control had been achieved, the plants were freshly infested with aphids, and the effect was examined after a further 48 hours. The results obtained are set out in the following table:

| Spray liquor concentration | Effect on the aphids after— ||||
|---|---|---|---|---|
|  | 48 hours || 48 hours fresh infection ||
|  | Example 1 | Example 2 | Example 1 | Example 2 |
| 0.08% | ++ | ++ | ++ | ++ |
| 0.04% | ++ | ++ | ++ | ++ |
| 0.02% | ++ | ++ | ++ | ++ |

C. In order to demonstrate the effect on aphids by diffusion through the leaves the following experiment was carried out with the use of spray liquors having contents of active substance of 0.08 percent, 0.04 percent and 0.02 percent.

The aforesaid spray liquors were sprayed only onto the upper sides of the leaves of broad bean plants of which the undersides of the leaves only were infested with aphids, and after 48 hours the effect on the undersides of the leaves was examined. The results obtained are set out in the following table:

| Spray liquor concentration | Effect on the aphids | |
|---|---|---|
| | Example 1 | Example 2 |
| 0.08% | ++++ | ++ |
| 0.04% | ++++ | ++++ |
| 0.02% | ++++ | ++++ |

D. In order to demonstrate the action of the compounds of Examples 1 and 2 as stomach poisons poplar leaves were immersed in the spray liquor containing 0.04 percent of active substance. After drying the leaves the caterpillars in the fourth larval stage of the poplar spider (*Stilpnotia calicis*) were fed on the leaves. After 36 hours the stomach poisoning effect was determined. In the case of the compound of Example 1, all the caterpillars were killed; and in the case of the compound of Example 2, 9 out of 10 caterpillars were killed.

For preparing the spray liquor concentrates other wetting or emulsifying agents than those mentioned above may be used. There may be used non-ionic products, for example, condensation products of aliphatic alcohols, amines, or carboxylic acids containing a long-chained hydrocarbon radical having about 10–30 carbon atoms with ethylene oxide, such as the condensation product of octadecyl alcohol with 25–30 mols of ethylene oxide, or the condensation product of soya bean fatty acid with 30 mols of ethylene oxide, or the condensation product of commercial oleylamine with 15 mols of ethylene oxide, or the condensation product of dodecylmercaptan with 12 mols of ethylene oxide. Among the anion-active emulsifying agents there may be mentioned the sodium salt of dodecyl alcohol sulfonic acid ester, the sodium salt of dodecyl-benzene sulfonic acid, the potassium or triethanol-amine salt of oleic acid or the triethanolamine salt of abietic acid or of a mixture of these acids, or the sodium salt of a petroleum sulfonic acid.

Instead of isopropanol there may be used another solvent for preparing the spray liquor concentrates, for example, ethyl alcohol, methanol, butanol, acetone, methyl ethyl ketone, methyl-cyclohexanol, benzene, toluene, xylene, kerosene, or a petroleum fraction. It will be understood that mixtures of the aforesaid solvents may be used.

Example 11

20 parts of the products obtained as described in Example 1 are mixed with 9 parts of chalk and 1 part of wetting agent. There is obtained a spray powder, with which spray liquors can be prepared by suspending the powder in water. Plum trees were treated with such a liquor containing 0.04 percent of active substance, and gave good results against plum fly caterpillars (*Hopoclampa flava et minuta*).

Example 12

1 part of the product obtained as described in Example 2 is mixed with 99 parts of talc. There is obtained an insecticidal dusting powder, which is suitable for dusting vines to control wine moths (*Clysia ambiguella, Polychrosis botrana*). The talc may be replaced wholly or in part by sulfur in which case the preparation is also effective against Oidium. Instead of talc another pulverulent carrier may be used, such as chalk, bentonite, kaolin or a mixture of two or more of these carriers.

Example 13

There is used a spray liquor which contains, per liter, 1 gram of zinc dimethyl-dithiocarbamate, 0.04 gram of compound No. 1 of the table in Example 4 and 0.08 gram of the compound No. 18. Fruit trees are sprayed in the summer with the liquor and a good control is obtained against aphids and scab (Fusicladium).

Example 14

Hop plants are watered with a liquor containing 0.04 percent of the compound of Example 2. All the hop plants were free from aphids and red spiders (Tetranychidae) after a short time.

Example 15

Good results are obtained with the compound of Example 2 by spraying plants with spray liquors containing 0.2 to 0.004 percent of active substance, against the following pests which are not mentioned in the preceding examples: Pear leaf psylla (*Psylla pyricola*), thrips (*Heliothrips haemorrhoidalis*), lecania (*Eulecanium corni*), peach insect (*Cydia molesta*), cotton leaf worm (*Prodenia litura*), ermine moth (*Hyponomeuta malinella et padella*), cherry blossom moth (*Argyresthia ephippella*).

Example 16

In tests on the action against aphids by the method described under B in Example 10 all the compounds given in the table of Example 4 gave good to excellent results.

In stomach poison tests (experimental procedure D in Example 10) the compounds of Example 4 and of Nos. 3 and 11 of the table in Example 4 were active to very active.

The compounds given in Example 5, possess a systemic action, when tested according to the experimental procedure A of Example 10.

What is claimed is:

1. An organic phosphorus compound which is represented by one of the general formulae

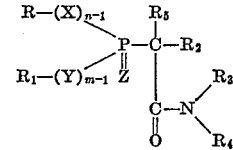

and

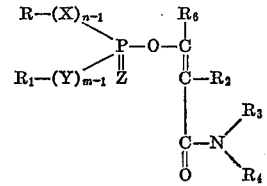

wherein R and $R_1$ represents a radical selected from the group consisting of an alkyl radical containing up to 18 carbon atoms, a cyclohexyl radical, an allyl radical, a benzyl radical, a chlorophenyl radical, a phenyl radical, a tetrahydrofurfuryl radical and radicals wherein R and $R_1$ together form part of a ring system, $R_3$ and $R_4$ represent radicals selected from the group consisting of a hydrogen atom, an alkyl radical containing up to 18 carbon atoms, a cyclohexyl radical, a methylcyclohexyl radical, a phenyl radical, a chlorinated phenyl radical and radicals wherein $R_3$ and $R_4$ together with the nitrogen atom form part of a ring system containing 6 ring members, $R_2$ represents a halogen atom, $R_5$ represents the group —$COR_6$, $R_6$ represents a radical selected from the group consisting of an alkyl radical containing up to 4 carbon atoms, a phenyl radical and a furfuryl radical, X and Y each represents a member selected from the group consisting of —O—, —S—, —NH— and >N—R (R being a lower alkyl radical), Z represents an atom selected from the group consisting of oxygen and sulfur and n and m each represents a whole number not greater than 2, and n and m together are at least 3.

2. An organic phosphorus compound which is represented by one of the following general formulae

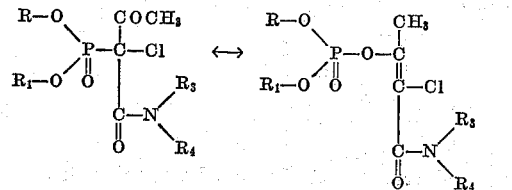

in which R, R₁, R₃ and R₄ each represents an alkyl radical containing 1-4 carbon atoms.

3. The compound of the formula

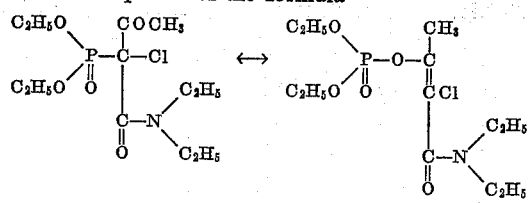

4. The compound of the formula

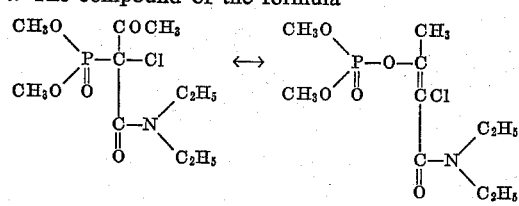

5. The compound of the formula

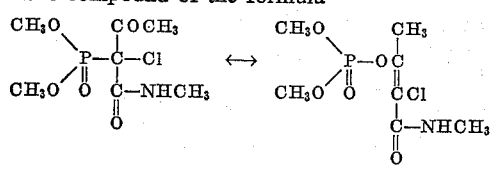

6. The compound of the formula

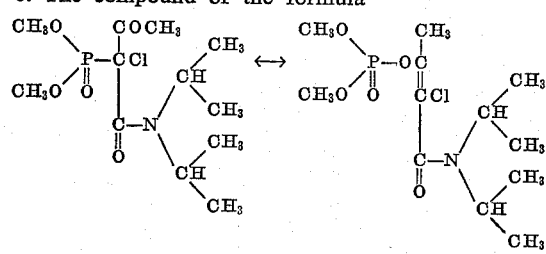

7. A preparation for combating pests which comprises in admixture with an inert and compatible carrier a phosphorus compound as defined in claim 1.

8. A preparation for combating pests which comprises in admixture with an inert and compatible carrier a phosphorus compound as defined in claim 2.

9. A preparation for combating pests which comprises in admixture with an inert and compatible carrier a phosphorus compound as defined in claim 3.

10. A preparation for combating pests which comprises in admixture with an inert and compatible carrier a phosphorus compound as defined in claim 4.

11. A preparation for combating pests which comprises in admixture with an inert and compatible carrier a phosphorus compound as defined in claim 5.

12. A preparation for combating pests which comprises in admixture with an inert and compatible carrier a phosphorus compound as defined in claim 6.

13. The method of controlling animal pests on plants which comprises applying to plants that are subject to attack by animal pests a pesticidal amount of an organic phosphorus compound which is represented by one of the general formulae

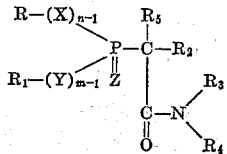

and

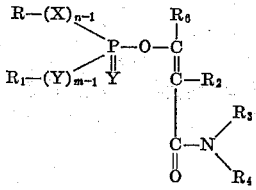

wherein R and R₁ represents a radical selected from the group consisting of an alkyl radical containing up to 18 carbon atoms, a cyclohexyl radical, an allyl radical, a benzyl radical, a chlorophenyl radical, a phenyl radical, a tetrahydrofurfuryl radical and radicals wherein R and R₁ together form part of a ring system, R₃ and R₄ represent radicals from the group consisting of a hydrogen atom, an alkyl radical containing up to 18 carbon atoms, a cyclohexyl radical, a methylcyclohexyl radical, a phenyl radical, a chlorinated phenyl radical and radicals wherein R₃ and R₄ together with the nitrogen atom form part of a ring system containing 6 ring members, R₂ represents a halogen atom, R₆ represents the group —COR₆, R₆ represents a radical selected from the group consisting of an alkyl radical containing up to 4 carbon atoms, a phenyl radical and a furfuryl radical, X and Y each represent a member selected from the group consisting of —O—, —S—, —NH— and >N—R (R being a lower alkyl radical), Z represents an atom selected from the group consisting of oxygen and sulfur and n and m each represents a whole number not greater than 2, and n and m together are at least 3.

14. The method of controlling animal pests on plants which comprises applying to plants that are subject to attack by animal pests a pesticidal amount of an organic phosphorus compound which is represented by one of the following general formulae

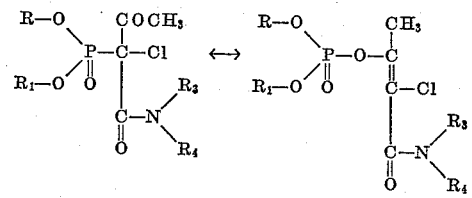

in which R, R₁, R₃ and R₄ each represents an alkyl radical containing 1-4 carbon atoms.

15. The method of controlling animal pests on plants which comprises applying to plants that are subject to attack by animal pests a pesticidal amount of the compound of the formula

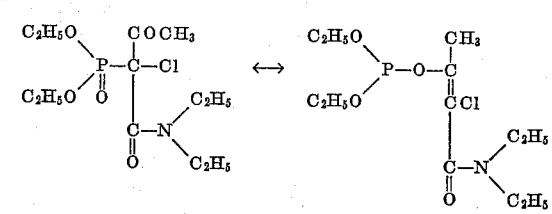

16. The method of controlling animal pests on plants which comprises applying to plants that are subject to attack by animal pests a pesticidal amount of the compound of the formula

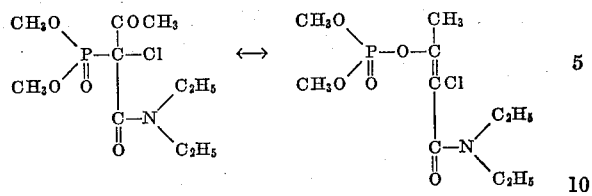

17. The method of controlling animal pests on plants which comprises applying to plants that are subject to attack by animal pests a pesticidal amount of the compound of the formula

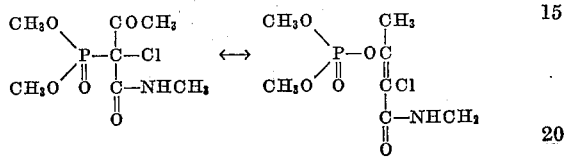

18. The method of controlling animal pests on plants which comprises applying to plants that are subject to attack by animal pests a pesticidal amount of the compound of the formula

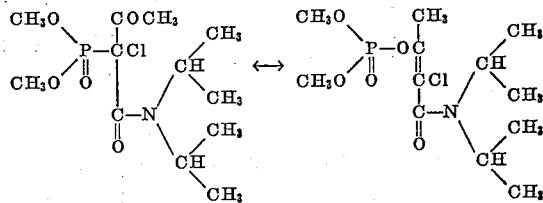

References Cited in the file of this patent
UNITED STATES PATENTS 2,685,552    Stiles _____ Aug. 3, 1954
2,802,855    Whetstone et al. _____ Aug. 13, 1957

UNITED STATES PATENT OFFICE

CERTIFICATE OF CORRECTION

Patent No. 2,908,605                          October 13, 1959

Ernst Beriger et al.

It is hereby certified that error appears in the printed specification of the above numbered patent requiring correction and that the said Letters Patent should read as corrected below.

Column 1, line 65, lower right-hand formula, upper right-hand portion thereof, for:

$$\underset{|}{CH_5} \quad \text{read} \quad \underset{|}{CH_3}$$

columns 7 and 8, in the table, fourth column thereof, opposite Item 29-30, for "$(CH_3O)_3$" read -- $(CH_3O)_3P$ --.

Signed and sealed this 31st day of May 1960.

(SEAL)

Attest:

KARL H. AXLINE
Attesting Officer

ROBERT C. WATSON
Commissioner of Patents